April 12, 1927.
F. C. RUTZ
1,624,510
HAND BRAKE FOR RAILWAY CARS
Filed Feb. 6, 1926
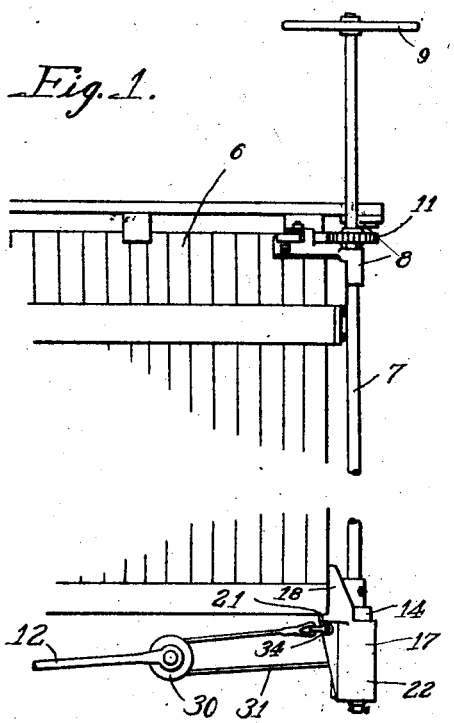
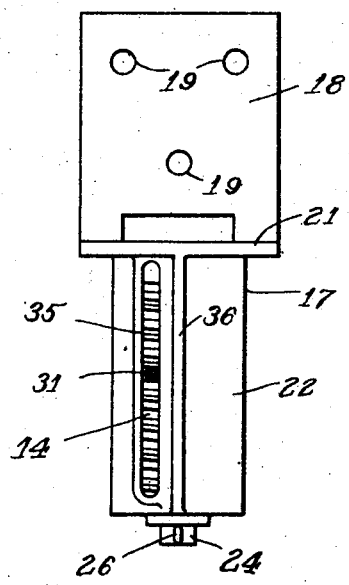
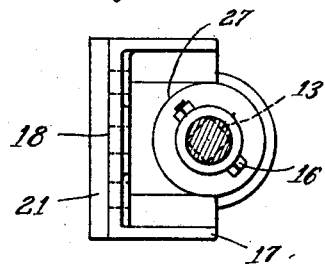
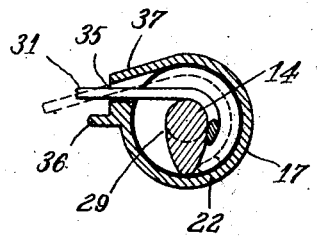
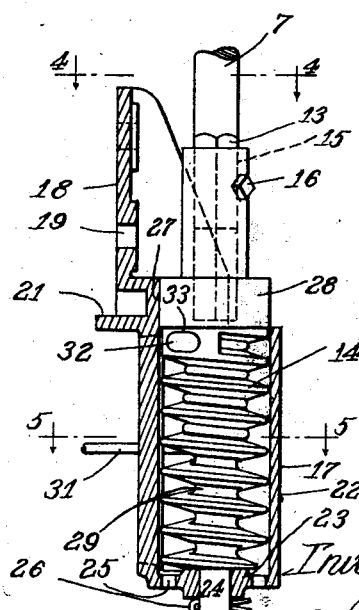
Inventor:
Frank C. Rutz
By Wilson & McKenna
Attys.

Patented Apr. 12, 1927.

1,624,510

UNITED STATES PATENT OFFICE.

FRANK C. RUTZ, OF ROCKFORD, ILLINOIS.

HAND BRAKE FOR RAILWAY CARS.

Application filed February 6, 1926. Serial No. 86,398.

This invention relates to brake mechanism for railway cars and has more particular reference to hand brake mechanism.

The hand brake for railway cars heretofore considered as a standard of safety consisted of a vertical brake shaft, suitably mounted on a car body and equipped with either a hand wheel or a drop handle lever for turning the shaft and with a ratchet wheel and pawl to prevent turning in one direction. A brake chain was connected to the shaft and to a brake rod comprising part of the brake rigging which connected with the air brake and the brake shoes. By turning the hand wheel the chain would be wound on the shaft, thereby acting on the brake rigging to set the shoes against the wheels. The brakes might be set either by the air brake or the hand brake, both operating through the brake rigging or connections leading to the brake shoes.

As railway cars increased in size, and for other reasons, the size of the air cylinder of the air brake mechanism was increased and the connections therefrom to the brake shoes were so constructed and supported as to meet the requirement that in each case the air brake must exert a force against the wheels equal to 60% of the light weight of the car. When the size and force of the air cylinders were less than at present, the so-called standard hand brake might be operated with the use of a brakeman's club to set the brakes practically as hard as the air would set them; but with the increase in size of railway cars and of the air brake mechanism referred to, the standard hand brake employing a chain was not equal to the air brake mechanism. This was due not only to the dimensional limitations or requirements imposed on the design of hand brake mechanism, but to the mechanical principle of a chain of this character winding on a shaft. In other words, the chain presents a lever arm of resisting force which is comparatively large and prohibits the increased mechanical advantage necessary to equal the applied force of the air cylinder. Furthermore, the chain presents a lever arm the length of which varies and is irregular as the chain winds upon the shaft, so that its action is not uniform. Another serious objection is that many accidents are caused by this type of hand brake, resulting every year in the loss of lives and in many injuries and a great amount of damage to rolling stock and other property. This is caused largely by the inability to develop sufficient braking force and to the physical impossibility of the brakeman to stop a car under every condition even with the leverage advantage afforded by the use of a club. Many accidents and deaths are caused by the "kick" from the club when releasing a set brake, as is well known in this art.

This condition has prompted the development of many different brake appliances, power multiplying devices, brake boosters, etc., either as a substitute for the standard hand wheel brake or as supplemental thereto for the purpose of securing a higher degree of safety in operation and of making the hand brake force equal to that of the air brake force, based on the maximum force of 125 pounds applied by the average brakeman. These prior constructions have been undesirable for many reasons, among which are that invariably they are of such construction as to impose a comparatively high cost, that in some cases they are much heavier than standard brake rigging and are not easily applied to all types of railroad cars, and in some cases they propose the entire elimination of the well known hand brake or wheel. Any design proposing the elimination of the familiar hand wheel or lever so well known to brakemen and which is so handy and easily operated in case of emergency cannot be considered desirable for the reasons, among others, that it must overcome custom, it raises a dangerous hazard in cases of emergency because of unfamiliarity with new types of brakes, and it necessitates scrapping of all old brake equipment of this kind, wherever a new installation is made. On the other hand, certain constructions have been proposed, retaining the so-called standard hand wheel or lever brake and endeavoring to interpose in the brake rigging between the brake chain and brake shoes or between the brake chain and air cylinder push rod some sort of power multiplying mechanism designed to accomplish the object above referred to. These devices are objectionable for many reasons, some of which are that they are more or less complicated, heavy, expensive to manufacture and install, in some cases being inapplicable to all types of railway cars and unsafe under all weather conditions. In some of the latter cases using a series of levers and sheave wheels the length of the brake chain has necessarily been increased to such an extent that after taking up the slack the chain would be wound so many times upon the brake shaft or mast that it would either foul on the mast step or would be so piled up on the mast that the power transmitted would be insufficient to meet the requirements.

The present invention aims to provide an improved hand brake mechanism of the character referred to which will utilize the standard hand wheel or lever brake with its shaft and mounting, and will employ an exceptionally simple and practical means for multiplying the manual force to a degree equal if not greater than that of the air brake mechanism. To this end my invention contemplates broadly the provision of mechanism of the character described including a flexible metallic cable such as a wire rope adapted to be wound on a brake shaft or mast drum and connected to the brake rigging, as described more fully hereinafter. This enables the center line of the cable pull to be brought closer to the center of the shaft or mast drum or, in other words, enables a shorter lever arm of resisting force than has heretofore been obtained in practice with the use of chains with the dimensional limitations imposed, and consequently increases the hand brake force with any given force applied on the rim of the hand wheel or on an equivalent lever, and also produces a smooth, constant application of braking force.

My invention also contemplates the provision of a simple and practical construction embodying the novel conception above referred to, characterized by a casing or housing in which the mast drum is mounted for rotation and which is shaped to enclose the spirally grooved portion thereof for the purpose of preventing displacement of the cable from its winding on the drum and for guiding the cable and maintaining it at all times in the desired operative relation to the drum. This embodiment of my invention is exceedingly simple and lends itself to strong and durable construction at a comparatively low cost. It is well adapted for the rough usage and requirements imposed on devices of this kind. For these and other reasons it is thoroughly practical for the purposes intended.

Other objects and attendant advantages will be appreciated by those skilled in this art as the invention becomes better understood by reference to the following description when considered in connection with the accompanying drawings, in which—

Figure 1 is a fragmentary side elevation of one end of a railway car equipped with my invention;

Fig. 2 is an enlarged vertical section with the mast drum in elevation, showing my invention more in detail;

Fig. 3 is a view looking at the left hand side of Fig. 2; and

Figs. 4 and 5 are horizontal sections taken substantially on the lines 4—4 and 5—5 respectively of Fig. 2.

In the present illustration of my invention the hand brake mechanism is applied to a conventional freight box car, the body of which is designated generally by 6. Only such parts of the brake mechanism are shown as are necessary for an understanding of the present invention. The well known parts comprise a brake shaft or mast 7, an upper bearing bracket 8, a wheel 9 fixed to the top end of the shaft, a ratchet wheel 11 fixed to the shaft and having the usual pawl for preventing the wheel and shaft from turning backward, and a brake rod 12 connected through the brake rigging with the cylinder push rod and the brake shoes in any suitable or preferred manner well known in this art.

In applying my invention to a railway car having the usual hand brake, I remove the brake shaft 7, cut off the cylindrical drum at the lower end thereof, square the end 13 of the shaft and substitute for the cut off end a mast drum designated generally by 14 which has a square socket 15 for the reception of the squared end 13 of the brake shaft. The mast drum and brake shaft may be secured together by any suitable means such, for example, as a bolt 16 passing through the interfitting parts.

The mast drum is supported for rotation in a casing or housing designated generally by 17 which in turn is shaped for rigid attachment to the railway car, preferably to the end sill thereof. This casing replaces the usual mast step which gives support to the lower end of the usual brake shaft. The casing in its preferred embodiment, has a broad, flat portion 18 adapted to be clamped against the end sill by bolts (not shown) passing through holes 19 in said portion, and a horizontal rib 21 adapted to seat against the under side of the end sill for locating the casing and for resisting any tendencies to tilt the casing. The casing is further shaped to provide a cylindrical portion 22 depending from the attachment portion 18 and being open at its top for the reception of the mast drum and having a bottom wall 23 providing a bearing for the reduced lower end 24 of the mast drum. The lower wall 23 has one or more openings 25 to permit water or other accumulations to drain or fall through. The mast drum is held from upward displacement by suitable means such as a cotter pin 26 passing through its projecting lower end 24. The casing further provides lateral bearing support for the upper end of the mast drum, this purpose being served by a semi-circular bearing surface 27 for the cylindrical bearing portion 28 of the drum which is located intermediate the square socket end or shank and the spirally grooved portion of the mast drum. It will be observed that the cylindrical portion 28 also serves to substantially close the opening at the upper end of the cylindrical portion 22 of the casing.

In the present embodiment of my invention the mast drum located within the casing portion 22 has a spiral V-groove 29 of substantial depth extending from end to end. In this groove is wound a flexible pulling means, in the present embodiment of my invention a metallic cable 31, this being a wire rope, one end 32 of which is fixed to the drum, this connection being established in any suitable manner and at present is accomplished by turning the ends of the cable strands back upon themselves or separating them and babbitting the enlarged end in a socket 33. The cable may be connected to the brake rod 12 or other connection preferably by being run over a single movable pulley or sheave 30, and may be connected at its opposite end in any suitable manner to the body of the car as, for example, to a fixed point 34 thereon. The cable emanates from the casing 22 through an elongated opening 35 therein, best shown in Fig. 3, this opening extending from end to end of the grooved portion of the mast drum. As shown in Figs. 3 and 5, the opening 35 is located off-center, in this instance at the inner side of a re-enforcing rib 36 extending lengthwise of the casing and located in a fore and aft plane intersecting the center of the mast drum. The inner wall 37 of the opening is substantially tangential with the cylindrical portion of the casing 22 and serves to effectively guide the cable when the mast drum is being unwound, as will be presently described.

It will be manifest from the foregoing that when the brake shaft is turned by operation of a hand wheel in a clockwise direction viewing Fig. 5, the cable will be wound in the spiral groove on the mast drum until the slack is taken up in the cable and brake rod connections, whereupon further turning of the brake shaft will exert a smooth and constant pull on the cable and brake connection 12 for applying or setting the brake shoes. Attention is now directed to the fact that in the present embodiment of my invention I am able to reduce the diameter of the mast drum and still obtain the desired cross-sectional strength in the drum due to the additional metal provided by the spiral ribs which form the groove. This permits of bringing the center line of the cable closer to the center of the mast drum and consequently of securing a shorter lever arm of resisting force and a greater mechanical advantage than is possible with any prior practical construction in this art, so far as I am aware. It will also be noted that the mast drum is of substantially uniform diameter from end to end, this being desirable throughout the portion used for applying or setting the brakes. In this embodiment of my invention with the use of a wire rope cable wound on a mast drum of this character I obtain an improved result, namely, that the center line of pull of the brake connection is brought closer to the fulcrum point and the maximum hand force applied on the hand wheel or lever estimating the average about one hundred twenty-five (125 lbs.) pounds, is increased in proportion to the shortening of this lever arm of resisting force. By making the mast drum of substantially uniform diameter throughout this portion the same force may be exerted regardless of the many varying conditions either in different applications of the brake device or of changing conditions such as lengthening or shortening of the brake connections in any single application. In other words, the present brake device has a wide range of operation as distinguished from certain prior constructions employing a tapering or conical mast drum, the spiral groove of which, in some instances, meets the zero center line of the drum and is inimical to the use of a cable and is furthermore prohibitive because of its insufficient cross-sectional dimension. Another advantage of the present invention is that the braking force is smoothly and constantly applied as distinguished from the jerky, irregular and variable pull resulting from a chain winding on a shaft or drum. It will be here noted that when unwinding the drum to loosen or slacken the brake connection, a positive pushing force may be imparted to the cable, at least in so far as unwinding it from the drum is concerned. When unwinding, the cable will be forced out against the internal wall of the cylindrical casing, as shown in dotted lines in Fig. 5, and by continued rotation of the mast drum in a counter-clockwise direction, the cable will be forced out of the groove 35, the cable being guided by said casing and its tangential wall 37, above-mentioned. It will be apparent, therefore, that the cable is at all times confined and positively held in operative relation to the grooved mast drum.

The following is a practical example of an application of my invention: It may be assumed that the force applied on the hand wheel 9 by the average brakeman is approximately one hundred twenty-five pounds and that the hand wheel provides a 15″ lever arm. The smallest diameter of the mast drum 14, that is, measured at the bottom of the grooves is 1 and $\frac{5}{16}$″. With a $\frac{3}{8}$″ flexible metal cable the lever arm of resisting force will be $\frac{21}{32}$ of an inch. The resulting force or pull on the cable will be 2222 pounds, which doubled by the movable pulley will give approximately 4444 pounds pull on the brake rod or connection 12, this being theoretical, without allowance for friction. Actual test develops approximately 4000 pounds braking force. This, it will be seen, is greater than the A. R. A. requirement of 3950 pounds air brake force and obviously enables application of a hand brake force equal to, if not greater than, that of the air brake. It follows, therefore, that with the use of my invention, I am enabled to increase the hand brake force to the desired extent and to accomplish this with a device which is exceptionally simple, practical and durable. It should be apparent, of course, that the common practice will be followed of making suitable provision in the brake rigging to take care of applications to railways cars of different sizes and constructions.

With my invention the average brakeman can properly and effectively control a car or cut of cars on any grade. This is especially desirable in gravity yards when making up trains and under any conditions where grades are involved. This is of vital importance as a safety factor and will promote the saving of both lives and property.

I claim:

1. A hand brake for railway cars comprising, in combination, a drum adapted to be rotated by the brake shaft, a wire rope cable connected to the drum and adapted to be connected to the brake rigging, and means including a housing for causing the cable to wind spirally on the drum when it is rotated for applying the braking force and for confining the cable, when the brake shaft is released, from expansion around the drum within a limit within which the cable is positively maintained in operative spiral relation to the drum so that one coil cannot cross another.

2. A hand brake for railway cars comprising, in combination, a drum adapted to be rotated by the brake shaft, a wire rope cable connected to the brake rigging, and means for causing the cable to wind spirally on the drum when it is rotated for applying the braking force and for confining the cable, when the brake shaft is released, from expansion around the drum within a limit within which the cable is positively maintained in operative spiral relation to the drum and within which limit the cable may be drawn from the drum by pull from the rigging or may be forced from the drum by reverse rotation of the brake shaft.

3. A hand brake for railway cars comprising, in combination, a drum adapted to be rotated by the brake shaft, a wire rope cable connected at one end to the drum and connected at its opposite end to the car frame and intermediate its ends to the brake rigging, and means for causing the cable to wind spirally on the drum and for confining the cable from expansion around the drum within a limit within which the cable is positively maintained in operative spiral relation to the drum.

4. A hand brake for railway cars comprising, in combination, a drum adapted to be rotated by the brake shaft, a wire rope cable connected to the drum and adapted to be connected to the brake rigging, and a housing adapted to be secured to a car frame, said drum being mounted for rotation in the housing, said cable being adapted to wind spirally on the drum when it is rotated and serving as the direct means for applying the braking force to the brake rigging, said housing being shaped to prevent expansion of the cable around the drum within a limit within which the cable is positively maintained in operative spiral relation to the drum.

5. In combination, a railway car frame, the brake rigging, a brake shaft, a housing secured to the car frame, a drum mounted for rotation in spaced bearings in the housing and connected to the brake shaft for supporting the latter on the car frame through the housing, and a wire rope cable connected at one end to the drum and anchored at its opposite end to the car frame, the cable being adapted to wind spirally on the drum intermediate its spaced bearings and connected intermediate its ends to the brake rigging for transmitting the braking force developed by rotation of the drum, said housing being shaped to confine the cable to the drum.

6. A brake device for railway cars comprising, in combination, a casting shaped for attachment to a car body and having an upright cylindrical housing open at its top, said casting having a lateral bearing adjacent the top of the housing and having a bottom wall provided with a bearing opening, a drum having a reduced lower end fitting in said bottom bearing opening and having an annular bearing portion at its upper end adapted to bear against said lateral bearing surface, the upper end of the drum being shaped for connection to the lower end of a brake shaft for rotation thereby, the drum having a peripheral spiral groove intermediate its upper and lower bearings, a flexible pulling means adapted to be wound in said groove on the drum and being connected at one end thereto, the housing having an elongated opening extending lengthwise of the drum, through which opening said pulling means emanates and is adapted to be connected to a brake rod connection, the spiral ribs on the drum defining the groove being of such diameter as to positively prevent displacement of the pulling means from the groove.

In witness of the foregoing I affix my signature.

FRANK C. RUTZ.